United States Patent [19]

Hagl et al.

[11] Patent Number: 5,621,411
[45] Date of Patent: Apr. 15, 1997

[54] POSITIONING WITH RF-ID TRANSPONDERS

[75] Inventors: Andreas Hagl, Dachau; Horst Mollik, Offenberg; Kostantin Aslanidis, Dachau, all of Germany

[73] Assignee: Texas Instruments Incorporated, Dallas, Tex.

[21] Appl. No.: 667,297

[22] Filed: Jun. 20, 1996

Related U.S. Application Data

[63] Continuation of Ser. No. 130,966, Oct. 4, 1993, abandoned.

[51] Int. Cl.[6] .......................... G01S 13/75; G01S 13/84
[52] U.S. Cl. .................. 342/42; 342/46; 342/51
[58] Field of Search .................. 342/42, 44, 47, 342/50, 51

[56] References Cited

U.S. PATENT DOCUMENTS

| | | | |
|---|---|---|---|
| 4,091,367 | 5/1978 | Harman | 340/552 |
| 4,898,120 | 2/1990 | Brose | 340/573 X |
| 4,908,627 | 3/1990 | Santos | 342/125 |
| 5,341,126 | 8/1994 | Boykin | 340/573 |
| 5,396,251 | 3/1995 | Schuermann | 342/51 |
| 5,406,275 | 4/1995 | Hassett et al. | 340/933 |
| 5,436,631 | 7/1995 | Magori et al. | 342/42 |
| 5,541,604 | 7/1996 | Meier | 342/42 |
| 5,543,798 | 8/1996 | Schuermann | 342/42 |
| 5,548,291 | 8/1996 | Meier et al. | 342/51 |
| 5,550,548 | 8/1996 | Schuermann | 342/42 |

FOREIGN PATENT DOCUMENTS

WO89/06367  7/1989  WIPO.

*Primary Examiner*—John B. Sotomayor
*Attorney, Agent, or Firm*—Rebecca A. Mapstone; James C. Kesterson; Richard L. Donaldson

[57] ABSTRACT

A method of determining the exact location of a transponder with respect to a reader antenna, with no additional components to the existing system required, is disclosed. An existing pin of the reader IC, the RSTP pin, provides an analog fieldstrength signal from which the distance to the reader antenna is deduced via known in the art signal processing methods. A grid or even an exact position location along a route is also achievable with initial set-up of at least two transponders a predetermined distance apart and a reader antenna.

4 Claims, 2 Drawing Sheets

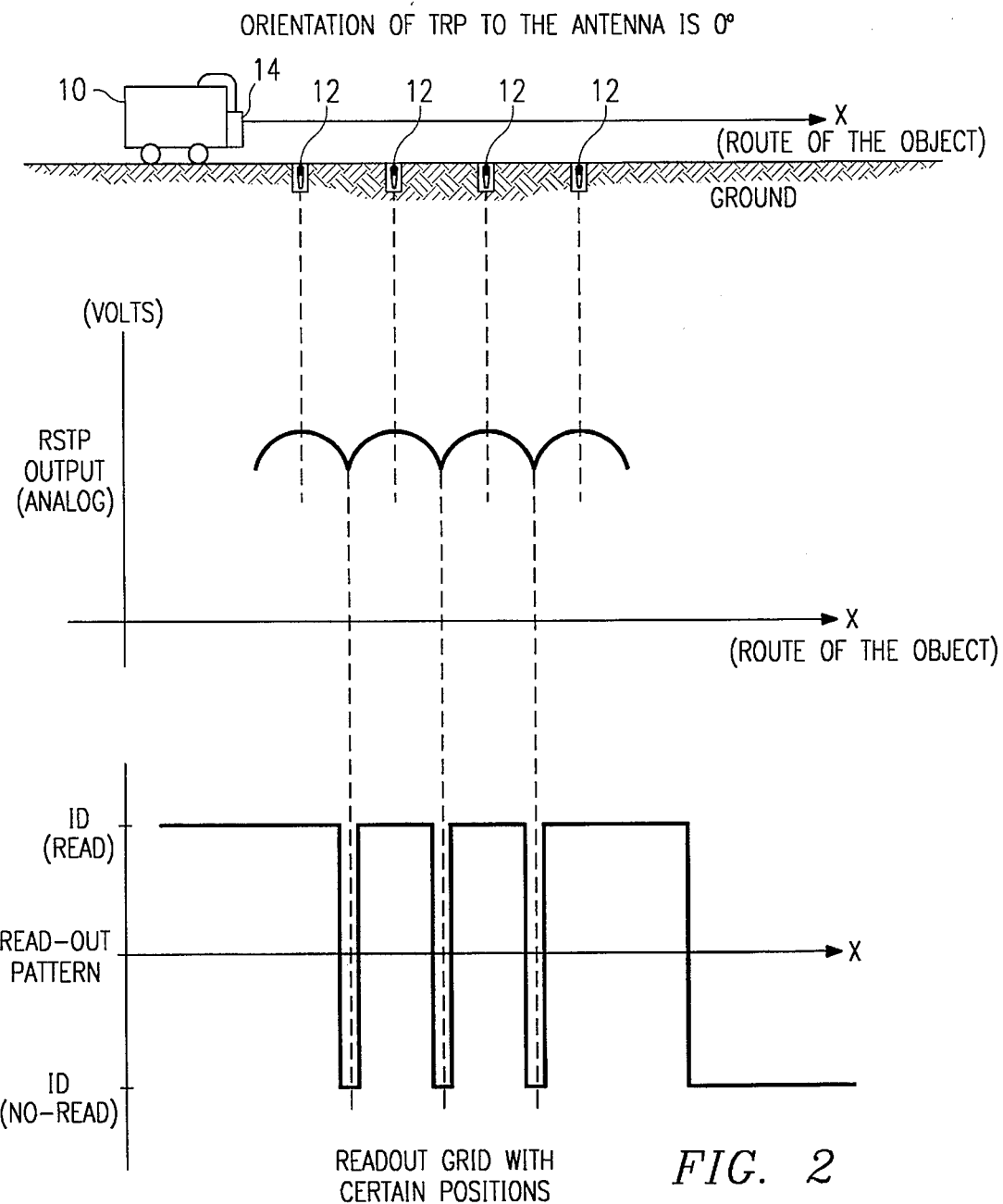
FIG. 2
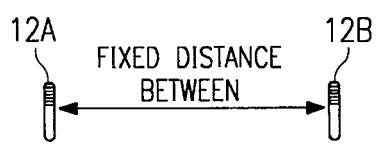
FIG. 3
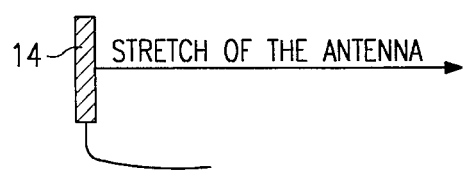

POSITIONING WITH RF-ID TRANSPONDERS

This application is a continuation of application Ser. No. 08/130,966, filed Oct. 4, 1993 now abandoned.

FIELD OF THE INVENTION

This invention relates to a method for determining the position of a transponder relative to the reader in existing interrogator/transponder RF-ID systems.

BACKGROUND OF THE INVENTION

In certain RF-ID systems, detecting that a transponder lies within the read field of the reader and identifying that particular transponder is inadequate information. Certain applications of RF-ID systems also require knowledge of the location of the transponder within that antenna read range with respect to the reader. One method of trying to determine the distance between the transponder and the reader is to use fieldstrength of the transponder response signal to calculate that distance. State-of-the-art transponders generally offer horizontal reading patterns of anywhere from 10 cm to 150 cm, depending upon the type of antenna and size. Therefore, when the reader receives a transponder response signal, that transponder could be disposed anywhere within that 10 cm to 150 cm horizontal reading pattern. In addition, the existence of noise in a system will play a detrimental role, as the noise may make the transponder response signal look more weak (i.e. the transponder further away) than it is, as the reader may have trouble distinguishing it from the noise. Furthermore, depending upon the orientation of the transponder with respect to the reader, the transponder may appear closer to the reader than another transponder while in actuality, the other transponder is actually closer, but just oriented in a less favorable fashion. A typical example of an application which would require being able to locate the transponder specifically would be when locating specific items in a warehouse in a warehouse application or locating a specific line item in an assembly line in a worktracking application.

SUMMARY OF THE INVENTION

One object of the invention is to provide a method of determining the distance between the transponder and the reader using only existing components. This method consists of using a designated pin of the existing reader IC, Received Signalstrength Test-Pin (RSTP), to provide the analog fieldstrength signal from which the distance between the transponder and the reader is deduced. One way to deduce the distance between the transponder and the antenna using the analog fieldstrength signal is to use an A/D converter and a microprocessor as is well known in the art.

One advantage of this method of determining the distance between the reader and the transponder is that no additional components are necessary. The information used to calculate the distance is available from an existing pin on the IC which can be the same IC used for control information and identification purposes.

A second advantage created by this method is that this system configuration provides the additional information of the distance between the transponder and the reader, which is essential in certain applications (i.e. worktracking, warehouse).

A third advantage of the system configuration is that it has a heightened insensitivity to noise due to the analysis stemming from the analog fieldstrength signal instead of the response telegram from the transponder.

A fourth advantage of this invention is the ability to determine not only the distance from the transponder to the reader but also, with a few additional measurements, the exact location of the transponder within that read range antenna pattern.

BRIEF DESCRIPTION OF THE DRAWINGS

FIG. 2 shows the transponder/antenna reading pattern configuration with the transponder oriented at a 0 degree angle with respect to the reader antenna according to the invention.

FIG. 3 shows a transponder/antenna arrangement wherein the position of the transponder is determined over greater distances by using two transponder signals and the analog fieldstrength signal according to the invention.

DETAILED DESCRIPTION OF THE PREFERRED EMBODIMENTS

Figure 1:
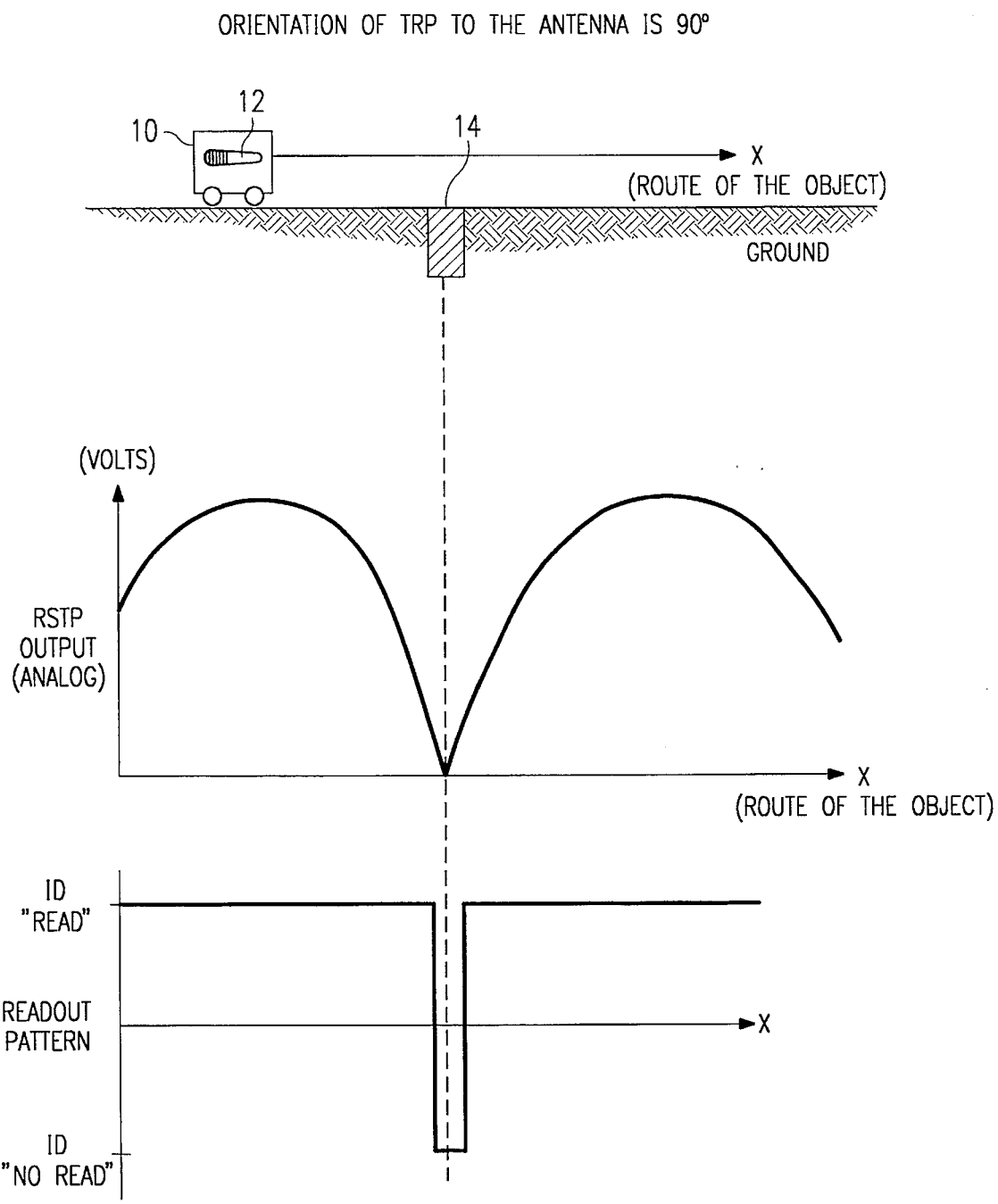
FIG. 1 shows the transponder/antenna reading pattern configuration with the transponder oriented at a 90 degree angle with respect to the reader antenna according to the invention.

In several warehouse and worktracking applications, it's often important to identify and determine the position of an object with respect to the reader. FIG. 1 shows a first preferred embodiment of the transponder/antenna arrangement. In this system configuration, the transponder 12, located on movable object 10, is oriented at a 90 degree angle with respect to the reader antenna 14. The object could be a trolley, a forklift truck or a container or a box on a conveyor belt. In the figure, the object 10 with transponder 12 attached is moving past antenna 14. In a preferred embodiment of the invention, this configuration is optimally suited for guided objects like objects on conveyor belts or on trains.

Also shown in FIG. 1 is the antenna reading pattern. Using the antenna readout characteristic alone, a rough location of the transponder can be deduced through the "read" "no-read" function of the transponder. Different fieldstrength signals are received by the reader antenna 14 from the transponder 12 in dependence upon the orientation of the transponder 12 with respect to the reader antenna 14 and/or in dependence upon the distance the transponder 12 is from the reader antenna 14. Therefore, fixed orientation between the reader antenna 14 and the transponder 12 is necessary to insure accurate distance measurements. In addition, orientation between the reader antenna 14 and the transponder 12 is generally known in most worktracking and warehouse applications. Moreover, by using the analog fieldstrength signal, which is available on the RSTP pin of the IC, the exact position of the transponder 12 (TRP) can be determined within that read range. A common method of determining the distance from the analog fieldstrength signal is via signal processing techniques using an A/D converter and a microprocessor.

FIG. 2 shows a system configuration wherein the transponders 12 are oriented at a 0 degree angle with the antenna 14. In this configuration, the antenna 14 is attached to, or located on, the movable object 10 and the transponders 12 are buried under ground. As the antenna 14 moves over the transponders 12, a readout pattern is generated creating a grid of the positions of the transponders 12. The distance between each transponder is fixed and they are disposed in a line. Using the analog fieldstrength signal in addition, allows a much more accurate position of the transponder 12.

Depending upon the distance between the transponder 12 and the antenna 14, different accuracies can result. For example, if the distance between the transponder 12 and the reader antenna 14 is 10 cm, the exact position of the transponder 12 can be determined within 5 mm. In other words the reading hole was 5 mm or 5%. If the application requires larger distances, larger antennas 14 may be used to increase the size of the antenna read pattern.

An alternative to using a larger antenna 14 to locate a transponder 12 further distances from the reader is to use two or more transponder response signals and the analog fieldstrength signal as shown in FIG. 3. In a preferred embodiment of the invention, a fixed orientation of the reader antenna 14 to the transponders 12 is 0 degrees and there is a fixed distance between the two transponders. If the antenna 14 starts reading directly in line with Transponder 12A and is moved to the right away from Transponder 12A and toward Transponder 12B, as shown in FIG. 3, the reader antenna 14 detects and identifies Transponder 12A. As the reader antenna 14 is mover further to the right such that the reader antenna 14 is disposed in the middle between Transponders 12A and 12B, a dead zone results such that the reader antenna 14 will not read either transponder 12. A dead zone may result from both transponders 12 sending response signals and the reader antenna 14 not being able to identify either. As the reader antenna 14 is moved further yet to the right such that the antenna is closer to Transponder 12B than to Transponder 12A, the reader antenna 14 will detect and identify Transponder 12B. Through this movement, a grid of the reach of the antenna reading pattern is determined, depending upon the distance of the transponders. If more than the grid is desired, an exact location can be further achieved by analyzing the analog fieldstrength signal RSTP via a pin of the IC. The application of route control with exact position indication can be achieved through an extension of the above-described system.

A few preferred embodiments have been described in detail hereinabove. It is to be understood that the scope of the invention also comprehends embodiments different from those described, yet within the scope of the claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

I claim:

1. A method of determining the exact location of a transponder with respect to a reader, having an antenna and an IC, comprising the steps of:

providing a test pin on said IC with an analog fieldstrength signal representative of the distance between a transponder and a reader antenna, wherein said IC also comprises control and identification information; and calculating the distance between a transponder and a reader antenna from said analog fieldstrength signal.

2. The method of claim 1, wherein the orientation between the transponder and the reader antenna is fixed.

3. The method of claim 1, wherein calculating said distance is performed via signal processing methods.

4. The method of claim 3, wherein said signal processing methods comprise using an A/D converter and a microprocessor.

* * * * *